F. COWLES.
HAY AND STOCK RACK.
APPLICATION FILED MAY 26, 1909.
991,607.
Patented May 9, 1911.
3 SHEETS—SHEET 2.
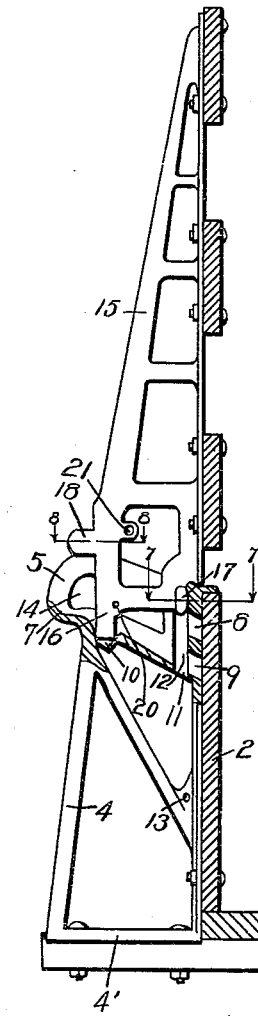
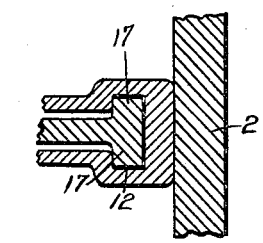
Fig. 7.
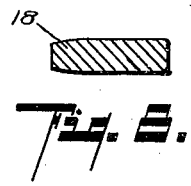
Fig. 8.
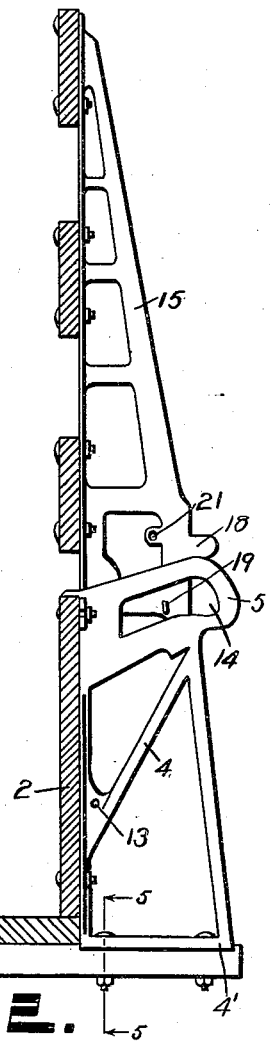
Fig. 6.
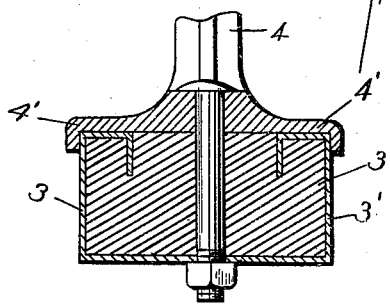
Fig. 5.
Witnesses
Clora E. Braden
Margaret L. Glasgow
Inventor
Frank Cowles
By Chappell & Earl
Attorneys

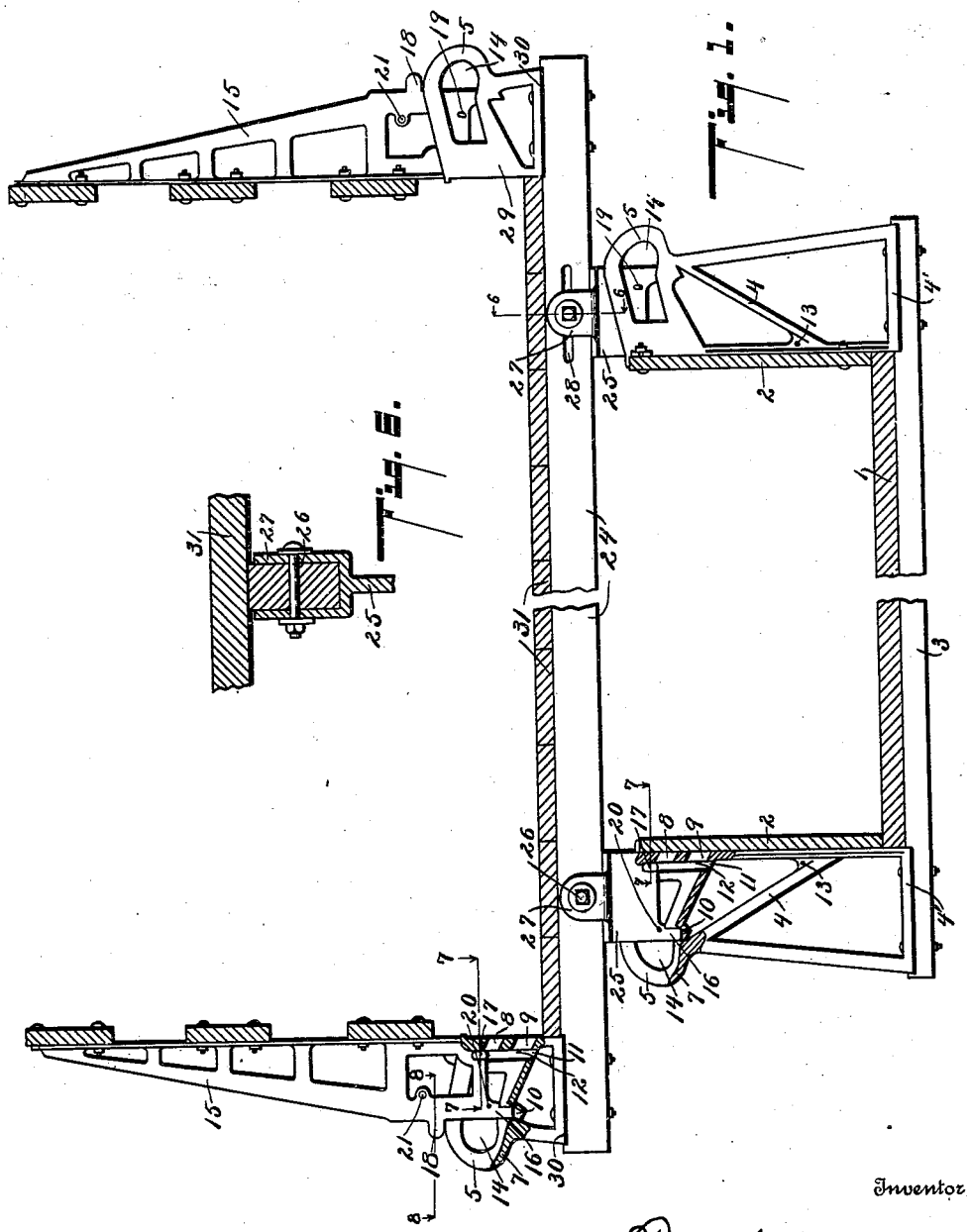

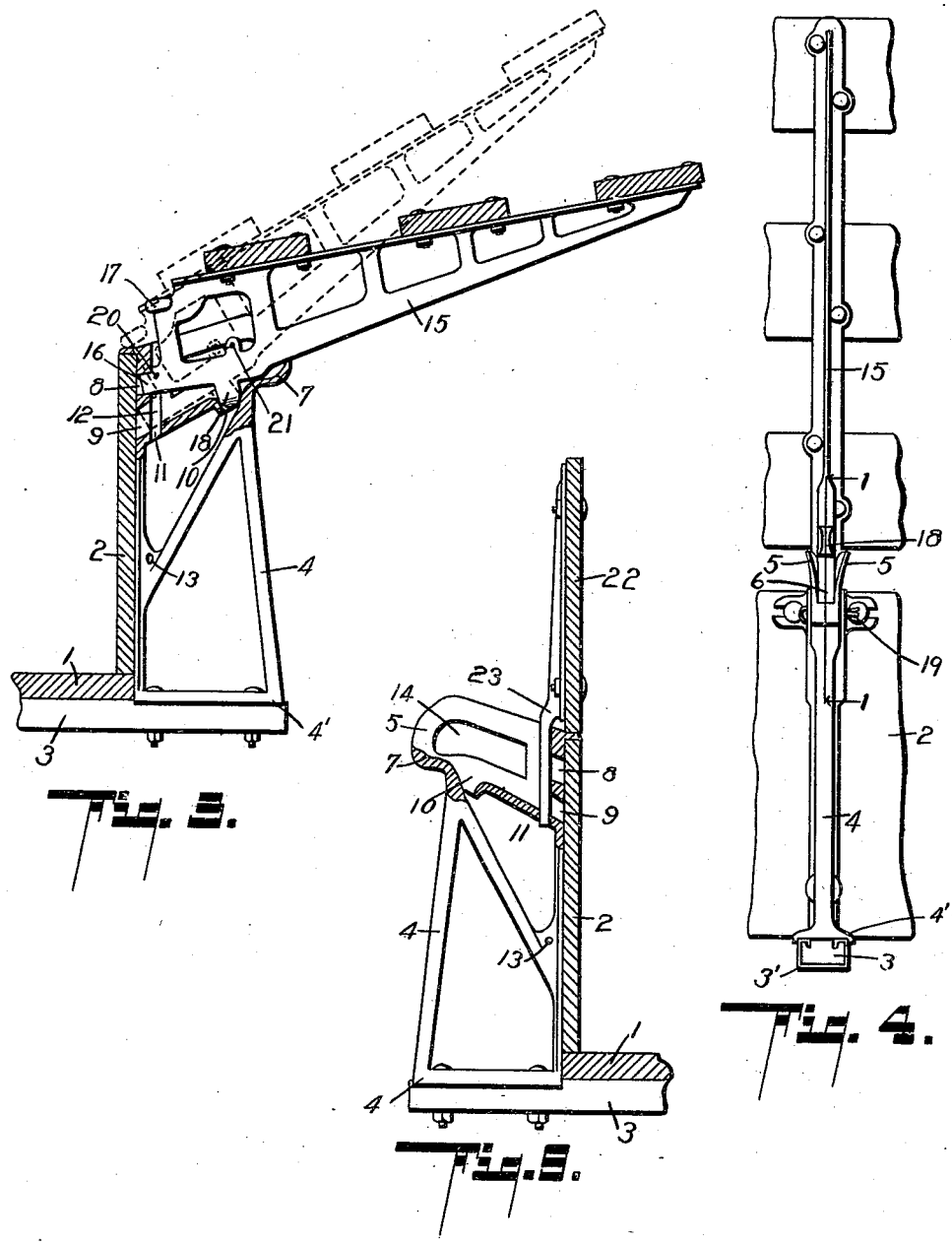

UNITED STATES PATENT OFFICE.

FRANK COWLES, OF TEKONSHA, MICHIGAN.

HAY AND STOCK RACK.

991,607. Specification of Letters Patent. Patented May 9, 1911.

Application filed May 26, 1909. Serial No. 498,407.

*To all whom it may concern:*

Be it known that I, FRANK COWLES, a citizen of the United States, residing at Tekonsha, Michigan, have invented certain new and useful Improvements in Hay and Stock Racks, of which the following is a specification.

This invention relates to improvements in combination hay and stock racks.

It is, in certain particulars, an improvement of the structure illustrated in U. S. Letters Patent No. 858,347, issued June 25th, 1907, to Henry M. Morrill and Fred A. Randall, and has also special features in addition thereto.

The object of this invention is to increase the security of such device, and to facilitate its manipulation, and also economize in its manufacture.

A further object is to greatly increase the capacity of such a rack when carrying small animals and also to greatly increase the deck capacity for carrying fruit or vegetables in baskets or packages.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a transverse detail sectional view through a combination hay and stock rack, embodying the features of my invention, portions being broken away to show details of construction and the bottom portion being shown in sections, the left hand brackets being in section on a line corresponding to line 1—1 of Fig. 4. Fig. 2 is a detail transverse sectional view, similar to the view of Fig. 1, except that the double decking has been removed and the hinged sides coupled directly to the side brackets instead of to said double decking. Fig. 3 is also a detail transverse sectional view, on a line corresponding to line 1—1 of Fig. 4, of one half of the rack showing the adjustment of the rack side to different angles, one of the adjustments being indicated by dotted lines. Fig. 4 is a detail elevation view of one of the side brackets and arms of the rack, shown in Fig. 2. Fig. 5 is a transverse sectional detail view somewhat enlarged of the bottom crossbar and bracket, taken on a line corresponding to line 5—5 of Fig. 2. Fig. 6 is an enlarged detail sectional view on line 6—6 of Fig. 1, showing the details of the coupling of the bracket to the upper deck. Fig. 7 is a detail sectional view enlarged on line 7—7 of Figs. 1 and 2, of the side arms when the rack side is vertical. Fig. 8 is an enlarged detail sectional view on line 8—8 of Fig. 2, showing the bevel of tenon 18. Fig. 9 is a detail sectional view showing the structure when a top box is in place on the rack body.

In the drawings, the sectional views are taken looking in the direction of the little arrows at the ends of the section lines, and similar numerals of reference refer to similar parts throughout the several views.

In describing my improved rack, I will first describe it as it appears in Fig. 2, where the double deck is omitted, and the parts are arranged in a structure comparable with the structure of the above-mentioned patent. Thereafter, I will describe the double deck device and its adaptation in this relation.

Referring to the numbered parts of the drawing, the body of my improved combination hay and stock rack consists of the bottom 1 and side boards 2—2, which are supported on cross pieces or bars 3, extending underneath the same and out into projecting supports at each side. These bars 3 are reinforced by a metal casing 3' wrapped around the same, and the brackets 4 at each side are mounted on these cross arms and cap over the outer ends by flanges 4', and are bolted securely to the projecting ends of said cross arms and also to the side 2. The upper part of the bracket 4 is divided with side projections 5—5, forming a recess closed at the bottom sides and inner ends to receive the arms of the pivotal rack sides above. The bottom of the recess between the wings 5—5 is square across. In the casting just within the outer end of the recess is a depression 7. Mortises 8, 9 are provided through the inner end wall of the recess to receive the bottom lug of the adjustable side arm when the same is stood outwardly at an angle, and a vertical slot 12 is formed to receive the lug 17 when the side arm is stood upright. A mortise 10 is provided in the bottom of the recess to receive the downwardly-projecting lug 18 when the arm projects horizontally, and to receive the end of the lug 16 when the arm is stood upright. The slot 12, terminating in mortise 11, is also to receive the stakes or shanks 23 that are on the side of the top box which will be hereinafter described.

The arms for the rack sides are provided with projecting tenons to engage the different mortises in the brackets. The tenon 16 projects into the mortise 8 or 9, to adjust the rack sides at different angles, as appears in Fig. 3. A laterally projecting tenon 18 engages in the mortise 10 when the tenon 16 is inserted in either of the mortises 8 or 9, as indicated when the rack side is adjusted at an angle. When the rack is adjusted to the vertical position, the tenon 16 extends into the mortise 10. There are projecting lugs 17 at each side of the upper portion of the rack arm which extend into the slot 12 and lock the parts in place.

The side plates 5 are skeletoned with openings 14 laterally therethrough. In the side arms for the rack 15 are perforations 20 and 21 into which are inserted large size pins, cotter pins preferably, when the arm is adjusted, and these lock the arms and prevent absolutely their withdrawal and the disengagement of the various tenons from the various mortises when the side arms are put in any particular position. A perforation 13 is provided in the bracket 4 into which the cotter pins are inserted when not in use to anchor the arms in place. The tenon 18 is beveled at each side, as appears from the sectional view in Fig. 8. When the sides of the rack are removed, the top box can be put in place, which consists of the sides 22, which are provided with downwardly-projecting stakes 23 which are curved outwardly and downwardly and arranged to engage in the slots 12 and mortises 11, as indicated clearly in Fig. 9.

From this description, it will now be readily understood that the operation of the structure is comparatively simple and easy. The side of the rack to be adjusted in place is raised up so that the lug or tenon 18 of each arm hooks into the corresponding recess of each corresponding bracket and engages the depression 7 toward the outer end of such recess. Because the lugs are beveled at the sides and because the sides of the recess are flared outwardly, this can be very readily and easily accomplished. When this is done the outer edge of the side of the rack is raised upwardly until the same pivots on the lug 18, resting in the said recesses 7, until each tenon 16 reaches a point at the right height to insert in the mortise 8 or into the mortise 9, depending on the height to which it is desired to adjust the rack. Then the side of the rack can be readily moved into place, when each tenon 16 of each arm will enter the desired mortise of each bracket and the tenon 18 will drop into the mortise 10 in the bottom of the recess of each corresponding bracket. Then the pin 19 can be inserted through the perforation 21 in each arm and extend into recesses 14 in each side when it will be impossible to remove the structure.

When it is desired to place the rack in the upright position, the same is raised until the tenon 16 engages in the mortise 10 when the structure drops down and the projecting lugs 17 engage the vertical slots 12 at the inner side of the bracket. A pin is then inserted through the perforation 20, and the whole structure is effectively anchored in place.

Considering now the double deck features, cross bars 24, corresponding to the number of brackets, are provided. On the under side of these cross arms are engaging members or blocks 25—25, which are secured to the said cross arms by bolts 26, through upturned ears 27, which embrace the same. One of the bolts 26 enters a slotted hole 28 in the said cross bars 24, which permits the same to be adjusted to take care of the variations in the width of the rack. Both sides might be thus constructed. These brackets are provided with downwardly-projecting lugs 16 and laterally-projecting lugs 17 to engage the brackets 4 in the same manner that they are engaged by the lower end of the side arms 15, such parts exactly corresponding thereto. Brackets 29 are provided with suitable flanges 30 at their bottom ends, corresponding to the flanges 4' at the bottom end of the brackets 4, and are secured to the outer ends of the cross bars 24. The upper portions of these brackets are identical with the upper portions of the brackets 4, and the side arms engage the same in the same way. It is desired to remark, however, that ordinarily the brackets 29 will be provided with the slots and apertures for retaining the side pieces in vertical position only, for the reason that the wide spread of the rack, which would be secured by adjusting the sides to the angular position, would very rarely be found to be desirable.

The rack is ordinarily used with the sides vertical when the double deck is applied. A floor 31, made up of longitudinal boards, is placed entirely across the cross bars 24, when the rack is used as a sheep rack, or for hogs. The central portion of the deck is removable when, for any reason, as in the carrying of fruit, it is desired to have a level ledge at each side of the rack.

Having thus described my invention, what I claim as new and desire to secure by Letters Patent is:—

1. In a combination hay and stock rack, the combination of the main body or box portion; brackets at each side, each having a recess at its upper end with flaring sides with mortises in the bottom and inner side thereof and a vertical slot at the inner end extending laterally into the side walls and with a curved depression toward the outer end beyond the outermost mortise, for fulcruming the arms of the rack sides and loosely engaging the lugs thereon when attaching and adjusting the same; rack sides having arms, each provided with a tenon and lateral lugs projecting from their inner ends and having a laterally-projecting tenon or lug on the under side to engage on the said curved depression, whereby the rack side can be swung on said laterally-projecting lug like a pivot to raise it into place; and a cross pin through an arm at each side disposed to engage a corresponding bracket for retaining the sides in position, coacting for the purpose specified.

2. In a combination hay and stock rack, the combination of the main body or box portion; brackets at each side, each having a recess at its upper end, with mortises in the bottom and inner side thereof and a vertical slot at the inner end extending laterally into the side walls and with a curved depression toward the outer end beyond the outermost mortise, for fulcruming the arms of the rack sides and loosely engaging the lugs thereon when attaching and adjusting the same; rack sides having arms, each provided with a tenon and lateral lugs projecting from their inner ends and having a laterally-projecting tenon or lug on the under side to engage on the said curved depression, whereby the rack side can be swung on said laterally-projecting lug like a pivot to raise it into place; and a cross pin through an arm at each side disposed to engage a corresponding bracket for retaining the sides in position, coacting for the purpose specified.

3. In a combination hay and stock rack, the combination of the main body or box portion; brackets at each side, each having a recess at its upper end with flaring sides, with mortises in the bottom and inner side thereof and a vertical slot at the inner end extending laterally into the side walls and with a curved depression toward the outer end beyond the outermost mortise, for fulcruming the arms of the rack sides and loosely engaging the lugs thereon when attaching and adjusting the same; and rack sides having arms, each provided with a tenon and lateral lugs projecting from their inner ends and having a laterally-projecting tenon or lug on the under side to engage on said curved depression, whereby the rack side can be swung on said laterally-projecting lug like a pivot to raise it into place, coacting for the purpose specified.

4. In a combination hay and stock rack, the combination of the main body or box portion; brackets at each side, each having a recess at its upper end, with mortises in the bottom and inner side thereof and a vertical slot at the inner end extending laterally into the side walls and with a curved depression toward the outer end beyond the outermost mortise, for fulcruming the arms of the rack sides and loosely engaging the lugs thereon when attaching and adjusting the same; and rack sides having arms, each provided with a tenon and lateral lugs projecting from their inner ends and having a laterally-projecting tenon or lug on the under side to engage on the said curved depression, whereby the rack side can be swung on said laterally-projecting lug like a pivot to raise it into place, coacting for the purpose specified.

5. In a combination hay and stock rack, the combination of the main body or box portion; brackets at each side, each having a recess at its upper end, with a mortise in the bottom thereof and a vertical slot at the inner end, extending laterally into the side walls and with a curved depression toward the outer end beyond the mortise, for fulcruming the rack sides and loosely engaging the lugs thereon when attaching and adjusting the same; and rack sides provided with a tenon and lateral lugs projecting therefrom and having a laterally-projecting tenon or lug on the under side to engage on the said curved depression, whereby the rack side can be swung on said laterally-projecting lug like a pivot to raise it into place, coacting for the purpose specified.

In witness whereof, I have hereunto set my hand and seal in the presence of two witnesses.

FRANK COWLES. [L. S.]

Witnesses:
CLAYTON C. JOHNSON,
JOSIE M. KEELEY.

---

Copies of this patent may be obtained for five cents each, by addressing the "Commissioner of Patents, Washington, D. C."